(12) United States Patent
Nelson et al.

(10) Patent No.: US 6,804,401 B2
(45) Date of Patent: Oct. 12, 2004

(54) METHOD FOR COMPRESSING DIGITAL DOCUMENTS WITH CONTROL OF IMAGE QUALITY SUBJECT TO MULTIPLE COMPRESSION RATE CONSTRAINTS

(75) Inventors: William E. Nelson, Penfield, NY (US); James M. Sweet, Rochester, NY (US); Remo J. D'Ortenzio, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 588 days.

(21) Appl. No.: 09/727,733

(22) Filed: Dec. 4, 2000

(65) Prior Publication Data

US 2002/0097917 A1 Jul. 25, 2002

Related U.S. Application Data

(60) Provisional application No. 60/203,816, filed on May 12, 2000.

(51) Int. Cl.[7] ............................................. G06K 9/36
(52) U.S. Cl. ..................... 382/239; 358/426.02; 341/51; 375/240.02; 348/404.1
(58) Field of Search ................................ 382/238, 244, 382/239, 240, 166, 232, 243; 341/51; 358/426.02–426.11, 426.01, 426.13, 426.14, 426.16; 704/270.1; 380/217, 269; 710/68; 708/203; 375/240.02, 240.08, 240.24; 348/384.1, 387.1, 390.1, 403.1, 404.1

(56) References Cited

U.S. PATENT DOCUMENTS

| | | | | |
|---|---|---|---|---|
| 5,479,587 A | | 12/1995 | Campbell et al. | 395/116 |
| 5,812,700 A | * | 9/1998 | Fang et al. | 382/239 |
| 5,915,079 A | * | 6/1999 | Vondran et al. | 358/1.15 |
| 6,031,939 A | * | 2/2000 | Gilbert et al. | 382/239 |
| 6,330,363 B1 | * | 12/2001 | Accad | 382/232 |
| 6,356,660 B1 | * | 3/2002 | Shannon | 382/232 |

* cited by examiner

*Primary Examiner*—Samir Ahmed
*Assistant Examiner*—Anand Bhatnagar
(74) *Attorney, Agent, or Firm*—Mark Costello; Christopher D. Wait

(57) ABSTRACT

A method for digital image compression of a raster image is disclosed which uses different compression methods for selected parts of the image and which dynamically adjusts compression and segmentation parameters to control tradeoff of image quality and compression. The image is encoded into a single data stream for efficient handling by disk, memory and I/O systems. This system provides a stable feedback loop that manages to a fine granularity (typically 8×8 pixel blocks) the compression of image data so as to be compliant with a plurality of compression constraints; the management of an incremental bias toward more aggressive compression that selectively applies the more aggressive compression methods to blocks that are the most tolerant with respect to visible artifacts; and the adjustable segmentation and compression parameters used to control the image compression.

7 Claims, 8 Drawing Sheets

METHOD FOR COMPRESSING DIGITAL DOCUMENTS WITH CONTROL OF IMAGE QUALITY SUBJECT TO MULTIPLE COMPRESSION RATE CONSTRAINTS

This application is based on a provisional application No. 60/203,816, filed May 12, 2000.

In digital systems, image format documents are often compressed to save storage costs or to reduce transmission time through a transmission channel. Lossless compression can be applied to these documents that can achieve very good compression on regions of the document that are computer rendered such as characters and graphics. However, areas of the document that contain scanned image data will not compress well. Lossy compression technologies such as JPEG can be applied to the document that will work well on scanned, continuous tone, areas of the document. Image quality problems arise with this compression technology, and with transform-coding technologies in general, at high contrast edges that are produced by computer rendered objects. A solution to this problem is to apply different compression technologies to the document to optimize image quality and compressibility. This leads to a greater challenge of managing and controlling the multiple compression technologies so as to achieve guaranteed compression rates.

U.S. Pat. No. 5,479,587 discloses a print buffer minimization method in which raster data is compressed by trying different compression procedures with increasing compression ratios until the raster data is compressed sufficiently to fit into a print buffer. Each time, a compression procedure with a higher compression ratio is selected from a predefined repertoire of such procedures, ranging from lossless procedures, such as run-length encoding, to lossy procedures such as JPEG. Generally, lossless encoding is effective for text and line art data while lossy encoding is effective on image data. However, lossy compression methods may produce poor print quality when the nature of the raster page calls for lossy compression in order to achieve a predetermined compression ratio. This is because only one of the selected compression procedures is summarily applied across each strip of the page. When a strip contains both image data as well as text or line art data, a lossy compression procedure will generally blur sharp lines that usually delineate text or line art data or may introduce other undesirable artifacts.

U.S. patent application Ser. No. 09/727.821 by Zeck et al. filed Dec. 04, 2000 describes a compression system in which plural image data blocks in a strip of data blocks are analyzed based on their content to determine which data types are present in each block. Subsequent to the analysis step, each block is assigned to a compression method that is optimal for its data type. Control of image quality and compression rate is thereby provided. This control is based on a priori optimizations and tradeoffs, with no mechanism to address achievement of "guaranteed" or required compression constraints.

The references described herein and above are incorporated by reference for their teachings.

SUMMARY OF THE INVENTION

A method for digital image compression of a raster image uses different compression methods for selected parts of the image and dynamically adjusts compression and segmentation parameters to control tradeoff of image quality and compression. The image is encoded into a single data stream for efficient handling by disk, memory and I/O systems.

In accordance with one aspect of the invention, there is provided a method of compressing a received document, comprising: receiving a document containing unknown combinations of a plural data types; determining a required compression amount for the document, compressing portions of the document with a compression method selected to meet a local compression constraint or set of constraints; comparing actual compression with said local compression constraint; and iteratively compressing portions of the document with progressively more aggressive compression techniques to meet said local compression constraint. The method may also provide for comparing actual compression of the document with a global compression constraint or set of global constraints; and iteratively compressing said document with progressively more aggressive compression techniques to meet said global compression constraint.

In accordance with another aspect of the invention, there is provided a compression system comprising: a document input, receiving documents containing unknown combinations of a plural data types; plural document compression systems, lossy compression and lossless compression; a compression comparison arrangement, comparing compressed document information with compression constraints to determine whether an amount of compression applied to a document meets compression constraint requirements; a feedback arrangement, controlling selection of said plural document compression devices to increase compression applied to documents to meet compression restraint requirements and an iterative compression processor, iteratively processing documents, responsive to said feedback arrangement.

The inventive system is in the stable feedback loop that manages to a fine granularity (typically 8×8 pixel blocks) the compression of image data so as to be compliant with a plurality of compression constraints; management of an incremental bias toward more aggressive compression that selectively applies more aggressive compression methods to blocks that are most tolerant with respect to visible artifacts; and adjustable segmentation and compression parameters used to control image compression. The components of the system include: processing of compression rate information so as to determine appropriate feedback signals to the segmenter; and a segmenter that is capable of responding to these feedback signals so as to progressively increase the bias toward more aggressive compression.

These and other aspects of the invention will become apparent from the following descriptions to illustrate a preferred embodiment of the invention read in conjunction with the accompanying drawings in which.

Figure 4:
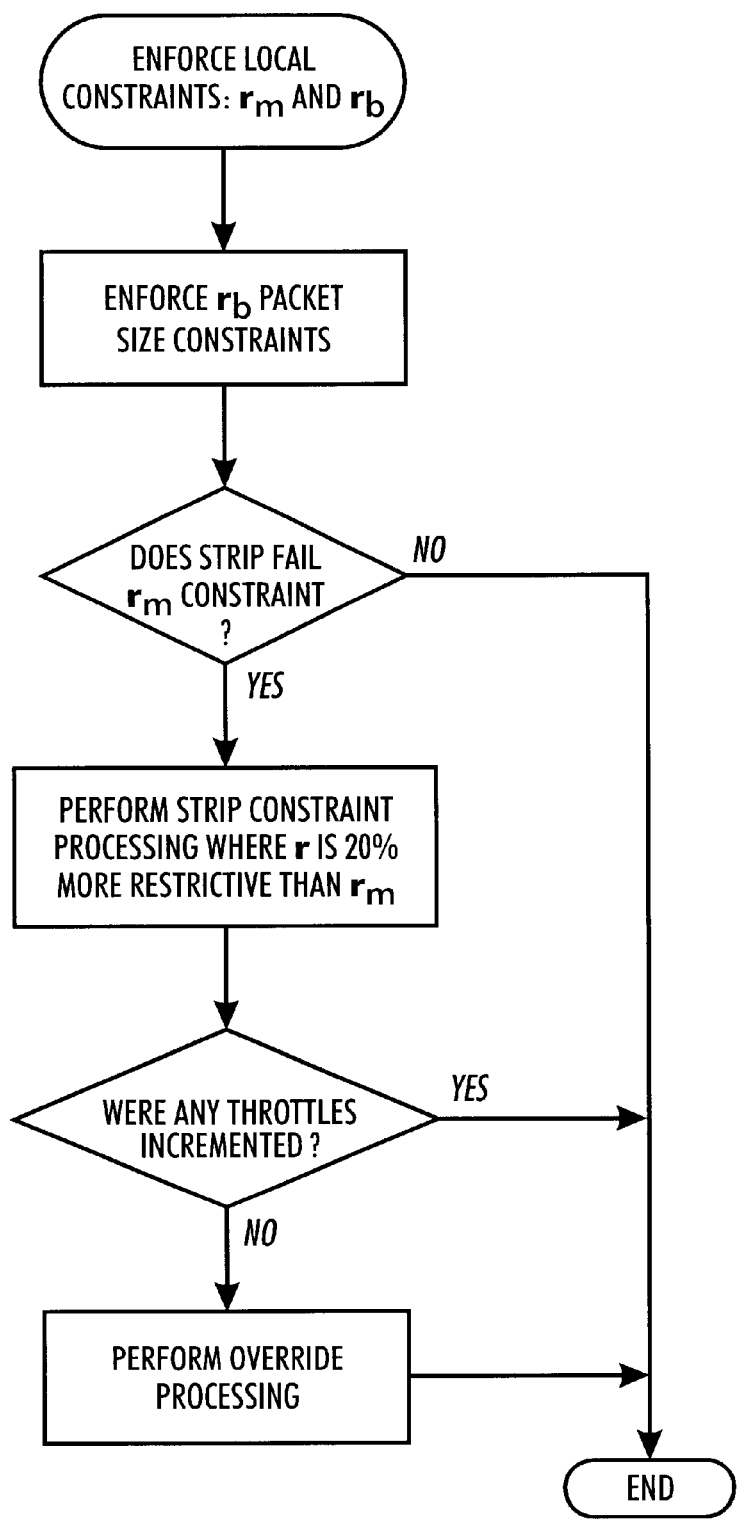

FIGS. 4 though 8 provide flowcharts of the compression control strategy of the embodiment.

The following definitions apply:

An "image" is a full-page image, or some portion of a full page. The image is the data set over which the global compression constraint(s) are iteratively applied.

A "strip" is a small interval of the input image to which the local compression constraint(s) are iteratively applied. A strip is eight scan lines in the preferred embodiment.

A "channel" is a collection of data of the same general type within a single strip. For example, the lossy image channel contains all the image data for a strip that is to be compressed with a plurality of lossy compression methods.

Figure 1:
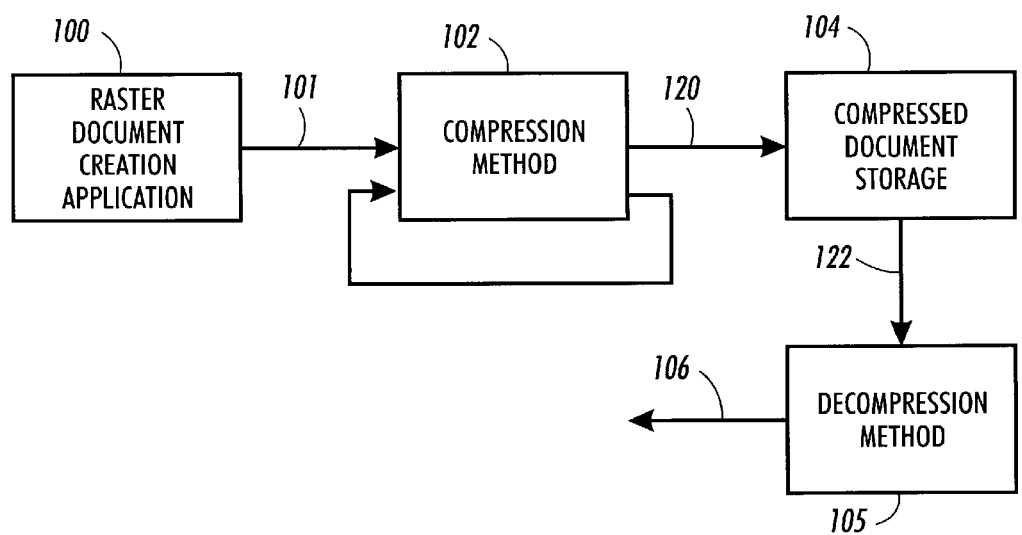
FIG. 1 shows a system in which the present invention may find application.

Referring now to the drawings, where the showings are for the purpose of illustrating the invention and not limiting same, FIG. 1 shows how the invention may be used. A raster document creation application 100, generates a scan line ordered raster format document at 101. Raster document creation application may be a raster editor or a system that converts a page description language document into a raster format for example, running on a computer or microprocessor-based document creation system. Scan line raster data is sent to a compression method 102 for compression. A feedback arrangement 103 provides an iterative method of applying more aggressive compression processing until compression constraints or requirements are satisfied. Output of compression method 102 at output 120 is a compressed data file, in compressed format storage 104. The compressed data file includes information about the compression method, to enable decompression. To regenerate the scan line raster format of the document, decompression method 105 received the document at 122, and processes compressed data that was generated by compression method 102. Scan line raster data at location 106 can be further processed as required. In typical systems, compression processing 102 can be performed with software or hardware, whereas commonly, a hardware board embedded in a computer system would provide decompression processing 105, although software processing is not precluded.

Figure 2:
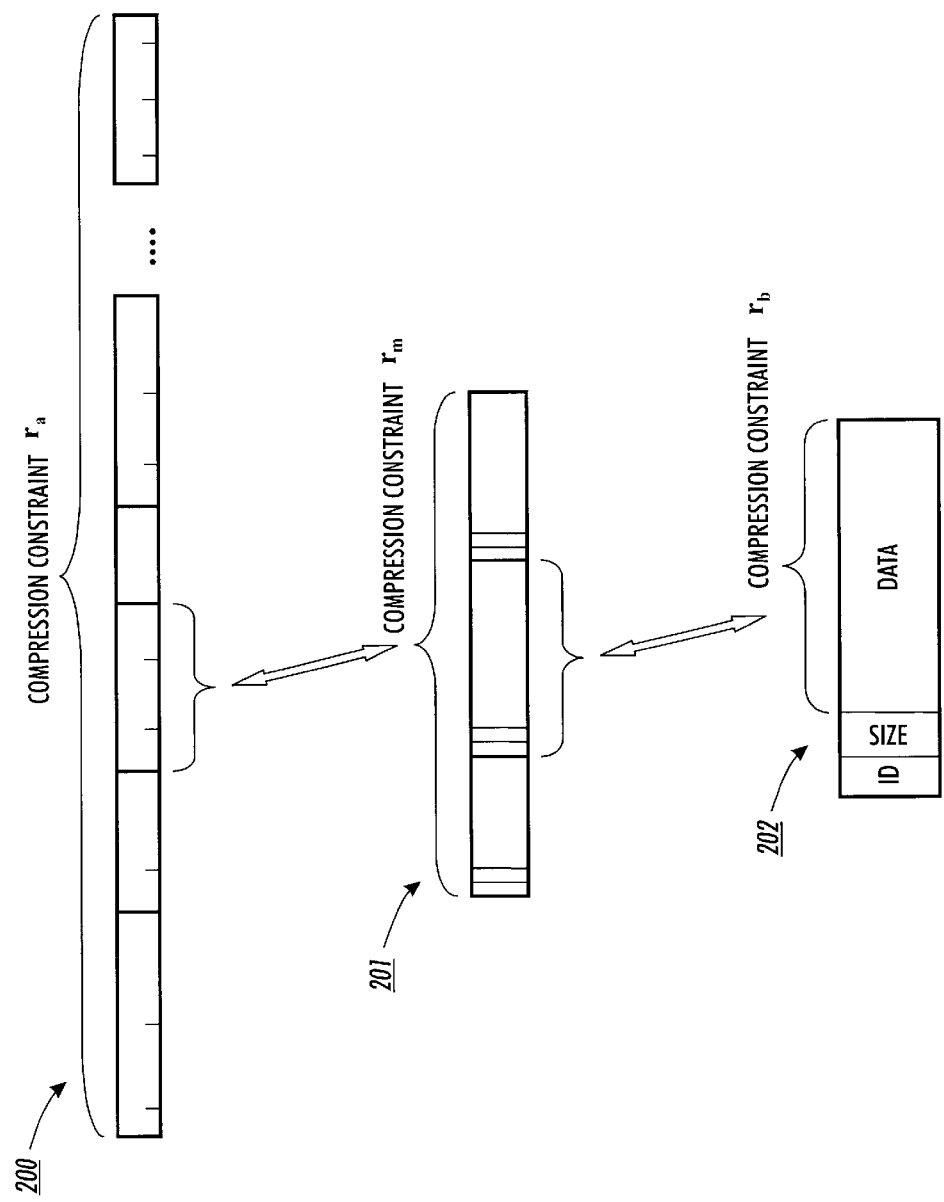
FIG. 2 illustrates the compressed data structure and its relationship to a plurality of compression constraints.

FIG. 2 shows diagrams of the compressed data structure. original raster image (received at input 101, FIG. 1) is compressed as a concatenation of a plurality of independently compressed strips as shown at 120. The overall average compression ratio of this data must meet compression constraint $r_a$. At 122, each compressed strip is includes of one or more compressed packets. Depending on the image data type, there may be a compressed packet for each lossy or lossless image compression channel. In all cases there will be a packet of losslessly compressed map data (see FIG. 3, 304). As used herein, map data refers to information about compression, and may include image data for use in decompression processing.

The sums of the sizes of the packets of a strip must meet the compression constraint $r_m$. In 120, each packet contains a packet-type identifier and size fields, followed by the compressed data. The compressed data must meet compression constraint $r_b$. It should be recognized that variants of the format of the output packet stream would be allowed, such as a linked list.

There are many reasons for compression constraints in the context of an overall system design. In general they relate to data bandwidths and buffer sizes of the decompression subsystem. In one possible embodiment, $r_a$ is the ratio of the average rate at which decompressed data is needed, divided by the bandwidth of the disk drive containing compressed data. The ratio $r_m$ constrains the maximum compressed strip size, and is driven by the bandwidth of the computer system bus of the decompression hardware. The ratio $r_b$ represents the size of the available FIFO buffer space on each decompression channel of the hardware board.

Figure 3:
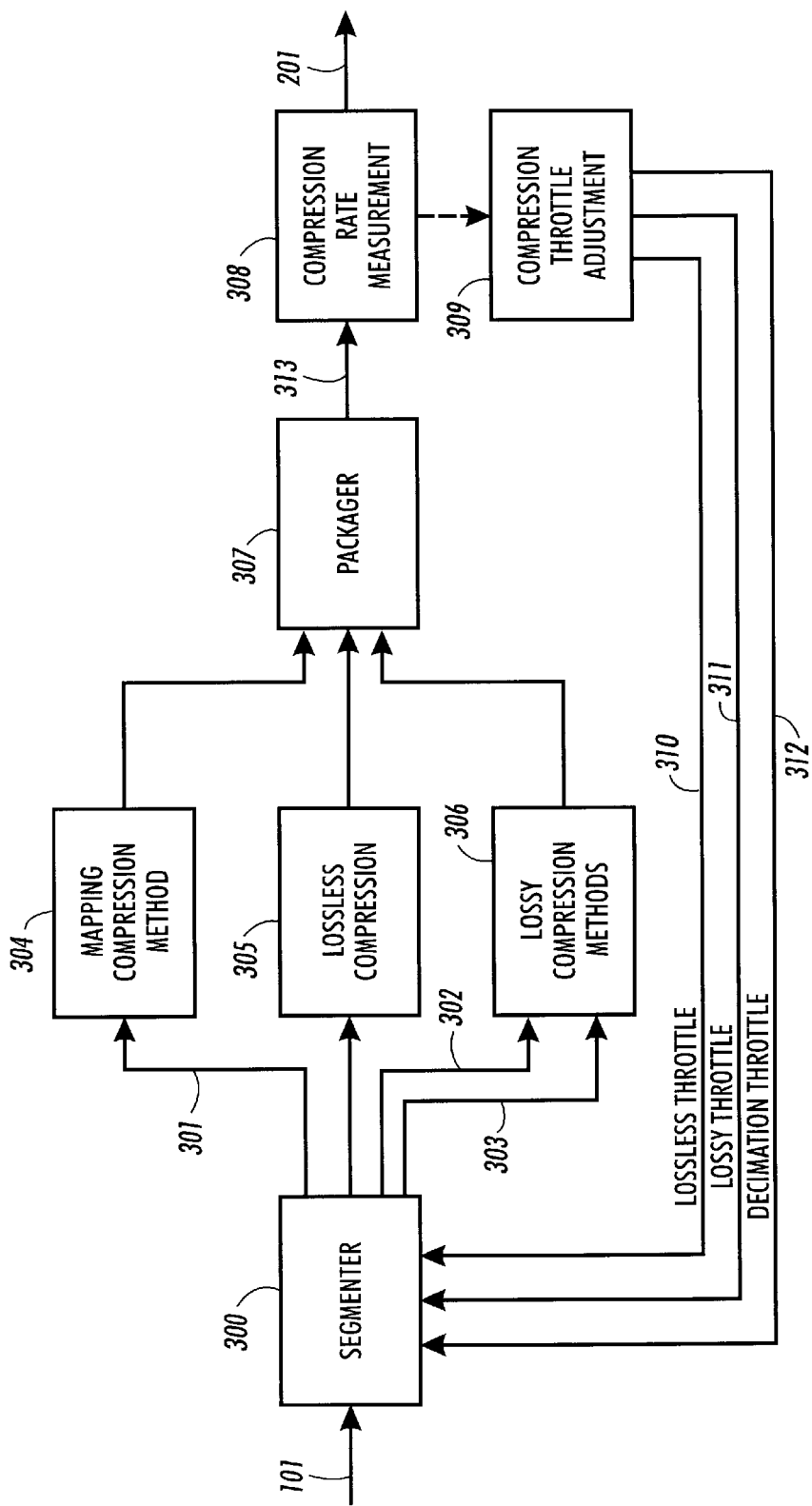
FIG. 3 illustrates the inventive compression method.

At FIG. 3, input to the compression system is scan line ordered raster format image as received at output 101. Input data is processed a strip at a time. Each strip is iterated processed until its local strip constraints ($r_b$ and $r_m$) are satisfied. In one embodiment, this process is accomplished serially, proceeding to completion before the next strip is processed. However, other processing orders area possible. Once the entire image is completed, the aggregate of the compressed data is checked for compliance with the global $r_a$ constraint. If this check fails, the entire process is repeated on the input image.

Segmenter 300 performs content-dependent separation of the image into lossy and lossless regimes. The present invention enhances analyzer and classifier systems that perform image segmentation as described in U.S. patent application Ser. No. 09/562,143, by Zeck et al., filed May 1, 2000, which is incorporated herein by reference for its teachings.

The segmentation enhancement provides for parameterized segmentation that can be iterated on the same input data to yield progressively more aggressive compression. Parameters controlling the degree of aggressiveness are referred to here as "throttles". Increasing values of lossless throttle 310 decrease the likelihood that an image block will be assigned to lossless channel 305 (i.e., the likelihood of assignment to the lossy channel increases). The lossless throttle modifies the "busy zone" thresholds of the U.S. patent application Ser. No. 09/562,143, by Zeck et al., filed May 1, 2000, by selecting a set of thresholds from among a group of alternative threshold sets as shown in Table 1. This threshold selection strategy provides the selectivity of the enhanced segmenter such that at each successive lossless throttle value, the image blocks that are least likely to produce visible compression artifacts are the ones to be reclassified to the lossly channel. Increasing values of lossy throttle 311 increase the likelihood that a given block within the lossy channel will be assigned to a more aggressive lossly compression method in 306. At each increased value of the lossy throttle, the classifier Lookup Tables of U.S. patent application Ser. No. 09/562,143, by Zeck et al., filed May 1, 2000, are replaced with a set of new lookup tables that specify JPEG compressions with higher Q tables for the image blocks most tolerant with respect to visible artifacts. Blocks of image data 302 that are routed to 306 have included with them attributes 303 that designate which of a plurality of lossy compressions within 306 should be used. Decimation throttle 312 is used as a last resort when desired compression rates are not achieved via lossless and lossy throttles. This throttle causes input data to be modified so as to reduce its complexity. Depending on the throttle value, 2×2, 4×4, or 8×8 pixel blocks are replaced with their average value. It should be recognized that other methods of image filtering could be utilized. In practice, the rarity for which the decimation is performed makes its simplicity desirable.

Consistent with U.S. patent application Ser. No. 09/727,824, by Zeck et al., filed Dec. 04, 2000, segmenter 300 also generates a segmentation map 301 that would be needed by a decompression system to reassemble the image. Map data is losslessly compressed at lossless compression method 304. Packager 307 generates an output packet stream 313 for the current image strip. At this point, it has not been validated that the output packet stream meets the compression constraint defined for output 201.

If compression rate measurement 308 validates that the constraints have been met, the compressed strip data is emitted at output 201, and processing continues with the next strip of image input data. If constraints are not met, then throttle parameters are adjusted 309 and the current strip is retried. The throttle adjustment strategy is a feature of the present invention. An important part of this strategy is that the feedback loop that the throttles provide is inherently stable. The lossless throttle has the effect of moving data from the lossless channel to the lossy channel. The lossy throttle increases the tendency toward aggressiveness of the lossy channel on an individual block basis throttle adjustment processing will be described in detail in conjunction with the flowcharts in the remaining figures.

FIG. 4 shows a flowchart that is an overview of processing that is performed on throttles of each strip in order to enforce local strip constraints ($r_b$ and $r_m$). The details of each of three processing modules in this flowchart are provided in the next three figures.

Figure 5:
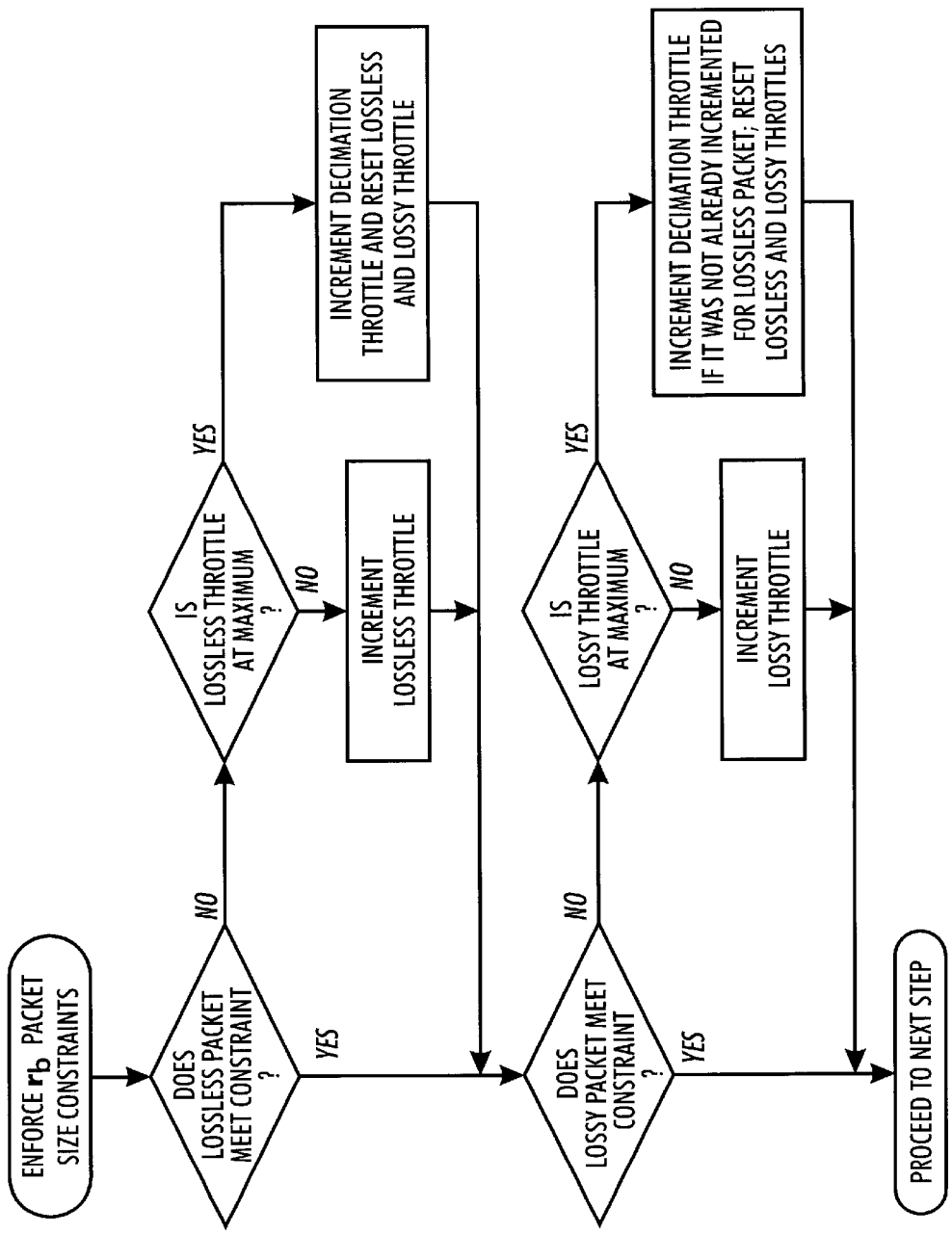

FIG. 5 shows a flowchart of processing that is performed on throttles of each strip in order to enforce $r_b$ packet size constraints.

Figure 6:
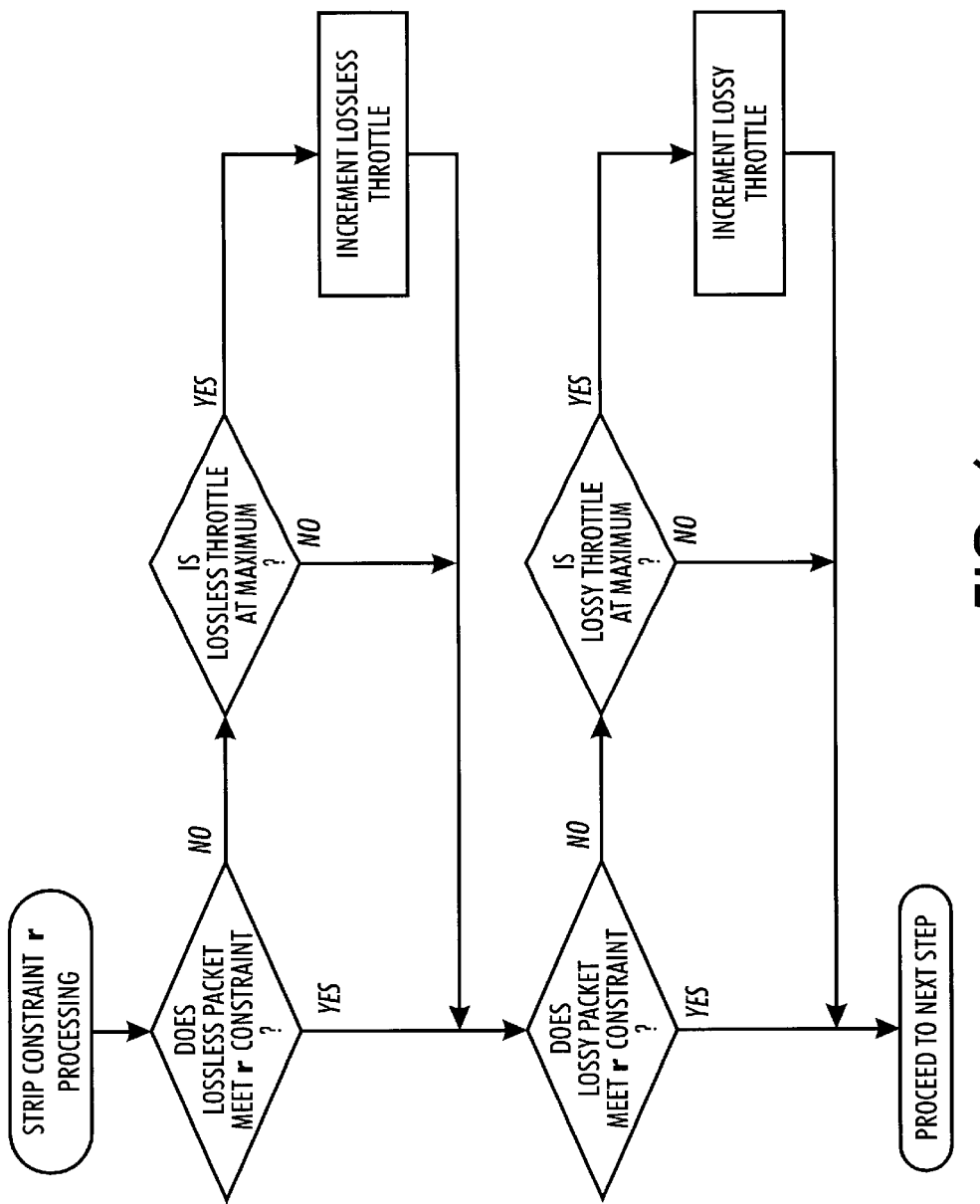
Figure 8:
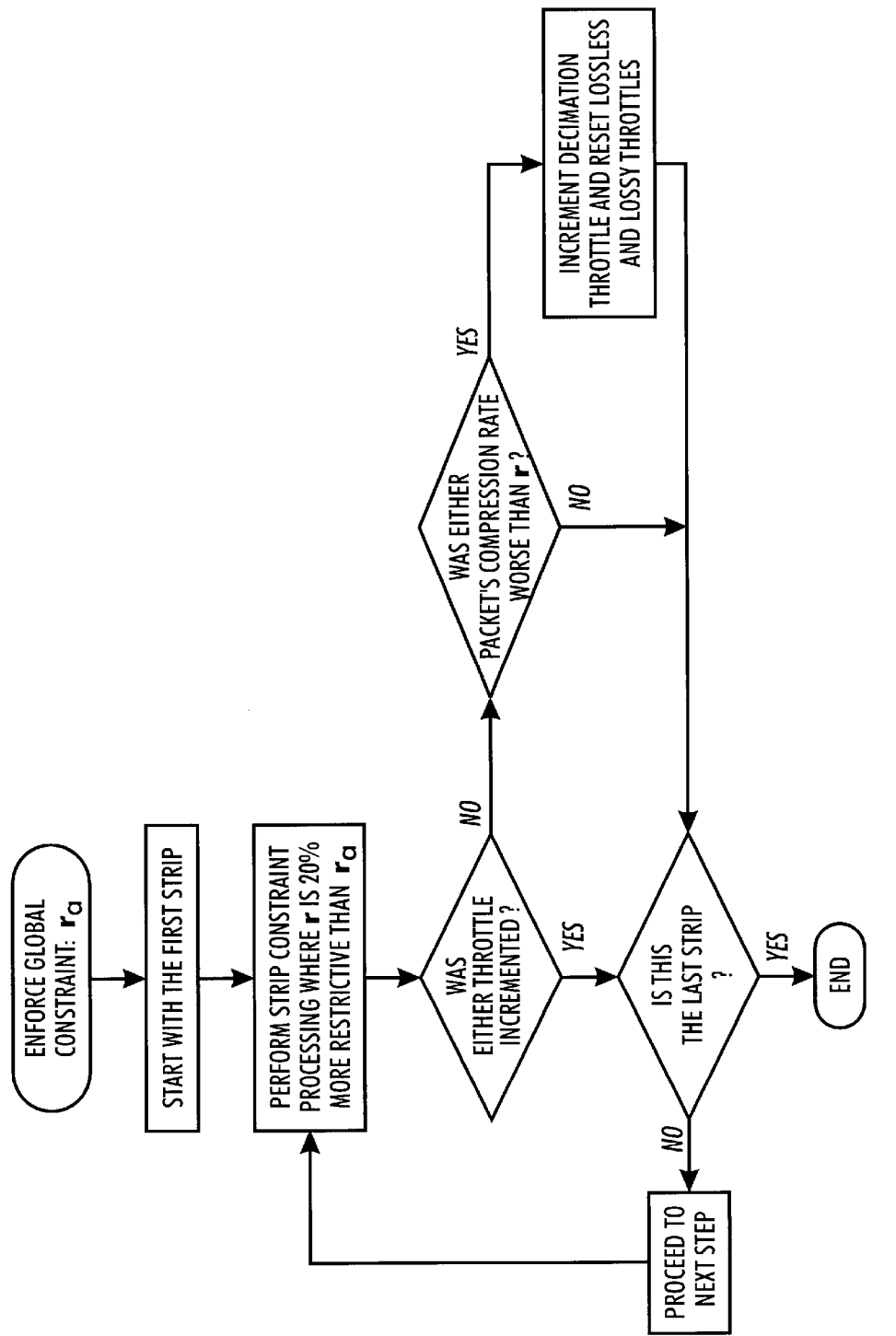

FIG. 6 shows a flowchart of processing that is performed on throttles of each strip in order to enforce compressed strip size constraints. processing described in this flowchart is invoked in FIG. 4 to enforce $r_m$ constraint, and is also invoked by processing of FIG. 8 to enforce $r_a$ constraint. Compression constraint r of FIG. 6 takes on different values depending on whether $r_m$ or $r_a$ is being applied. For the $r_m$ case, the actual value used for r is 20% more restrictive than the target rate $r_m$. Likewise, for the $r_a$ case, the value used for r is 20% more restrictive than global target rate $r_a$. As used here, "more restrictive" is in the direction of requiring more aggressive compression. The 20% margin is used to increase the number of candidate packets for subsequent recompression. Packets that just barely met their targets are recompressed with a more aggressive throttle so as to reduce the likelihood that other poorly compressing strips will have to be iterated to severely aggressive throttle levels. Only packets that exceed their target compression rates by more than 20% are left untouched for the current iteration. It should be recognized that the 20% margin was empirically determined and is subject to change.

Figure 7:
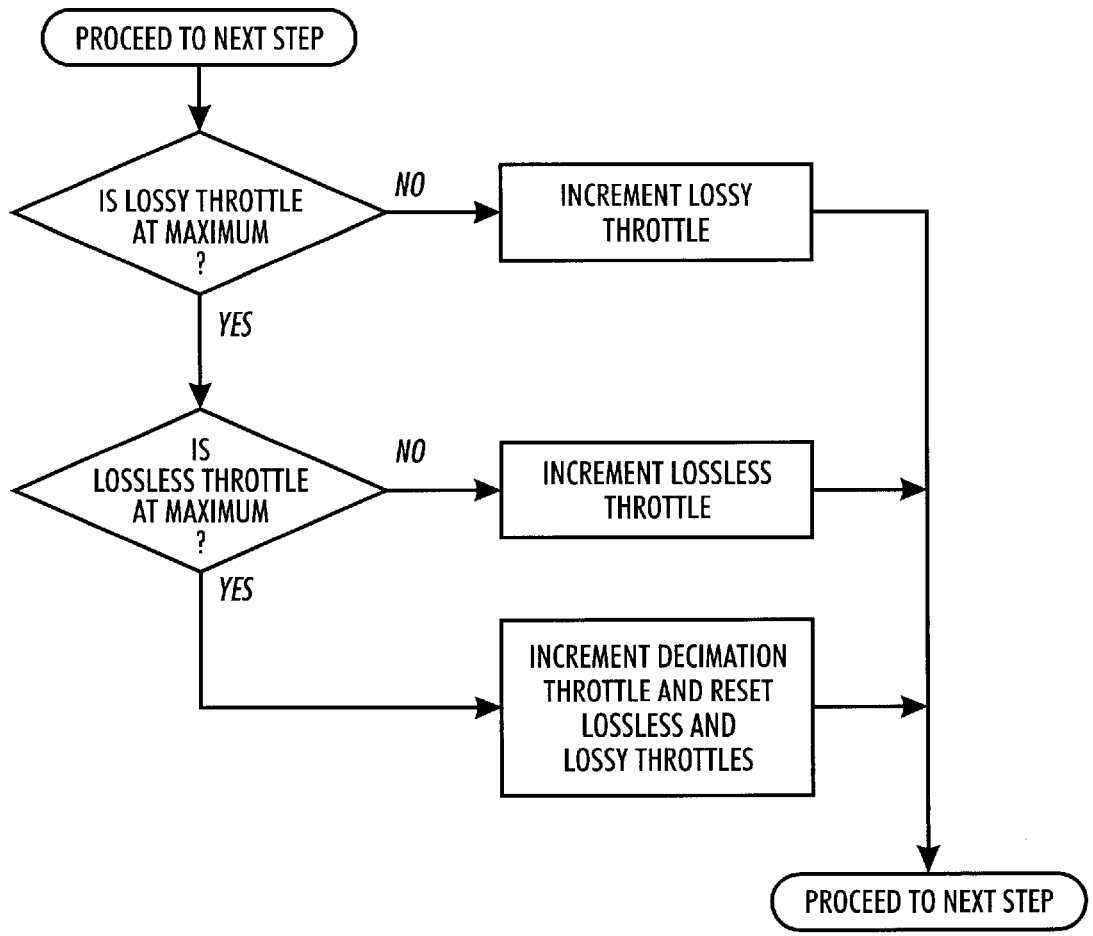

FIG. 7 shows a flowchart of override processing that is performed on throttles of each strip in order to enforce constraint $r_m$ as shown in FIG. 4. This processing is needed for the case where the lossless and lossy packets compress well enough to where their throttles are not incremented, yet the strip does not meet the $r_m$ constraint due to overhead of the compressed map data.

FIG. 8 shows a flowchart of processing that is performed on throttles of each strip in order to enforce global $r_a$ constraint. Once initial compression of the entire image is completed with enforcement of local compression constraints, the aggregate of compressed data is checked for compliance with global $r_a$ constraint. If this check fails, processing of the image is repeated according to this flowchart until the global constraint is met. Note that if the image is to be reprocessed, throttles for each of the strips are not reinitialized. All throttles pickup where they left off and are further incremented until the global target is achieved.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware, or combinations there of, is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

TABLE 1

| Lossless Throttle Value | Busy Zone Thresholds |
| --- | --- |
| 0 | 20, 60, 130 |
| 1 | 20, 40, 110 |
| 2 | 20, 20, 100 |
| 3 | 20, 20, 60 |
| 4 | 1, 20, 40 |
| 5 | 1, 2, 3 |

What is claimed is:

1. A method of compressing a received document, comprising:

receiving a document containing unknown combinations of a plurality of data types;

determining a required compression amount for the document as based upon a target decompression subsystem;

providing at least a more aggressive compression method, and a less aggressive compression method;

segmenting the document to select which compression method is to be applied to a given data portion as selectively segmented from the plurality of data types;

compressing the selected data portions of the document with the selected compression method to meet a local compression constraint;

comparing the actual compression result with the required compression amount for the document; and, iteratively directing the segmentation step as determined necessary by the comparing step to re-select the segmented data portions of the document and re-select which are to be compressed with the more aggressive compression method so as to meet the required compression amount for the document.

2. The method described in claim 1, and including comparing actual compression of the document with a global compression constraints;

iteratively compressing said document with progressively more aggressive compression techniques to meet said global compression constraint.

3. A compression system comprising:

a document input, receiving documents containing unknown combinations of a plurality of data types;

plural document compression systems, providing at least a more aggressive compression and a less aggressive compression;

a segmenter selecting which document compression system the plurality of data types are to be compressed by;

a compression comparison arrangement, comparing compressed document information with compression constraints to determine whether an amount of compression applied to a document meets compression constraint requirements;

a feedback arrangement, controlling the segmenter selection of said plural document compression systems so as to change the assignment of data types between a more aggressive compression and a less aggressive compression to meet compression constraint requirements; and an iterative compression processor, iteratively processing documents, responsive to said feedback arrangement.

4. The compression system of claim 3 wherein the more aggressive compression and the less aggressive compression are both lossless.

5. The compression system of claim 3 wherein the more aggressive compression is lossy and the less aggressive compression is lossless.

6. The compression system of claim 3 wherein the more aggressive compression and the less aggressive compression are both lossy.

7. The compression system of claim 3 further comprising a packager to combine the outputs of the compression systems as compressed document information and present the compressed document information to the compression comparison arrangement.

* * * * *